Patented Jan. 31, 1933

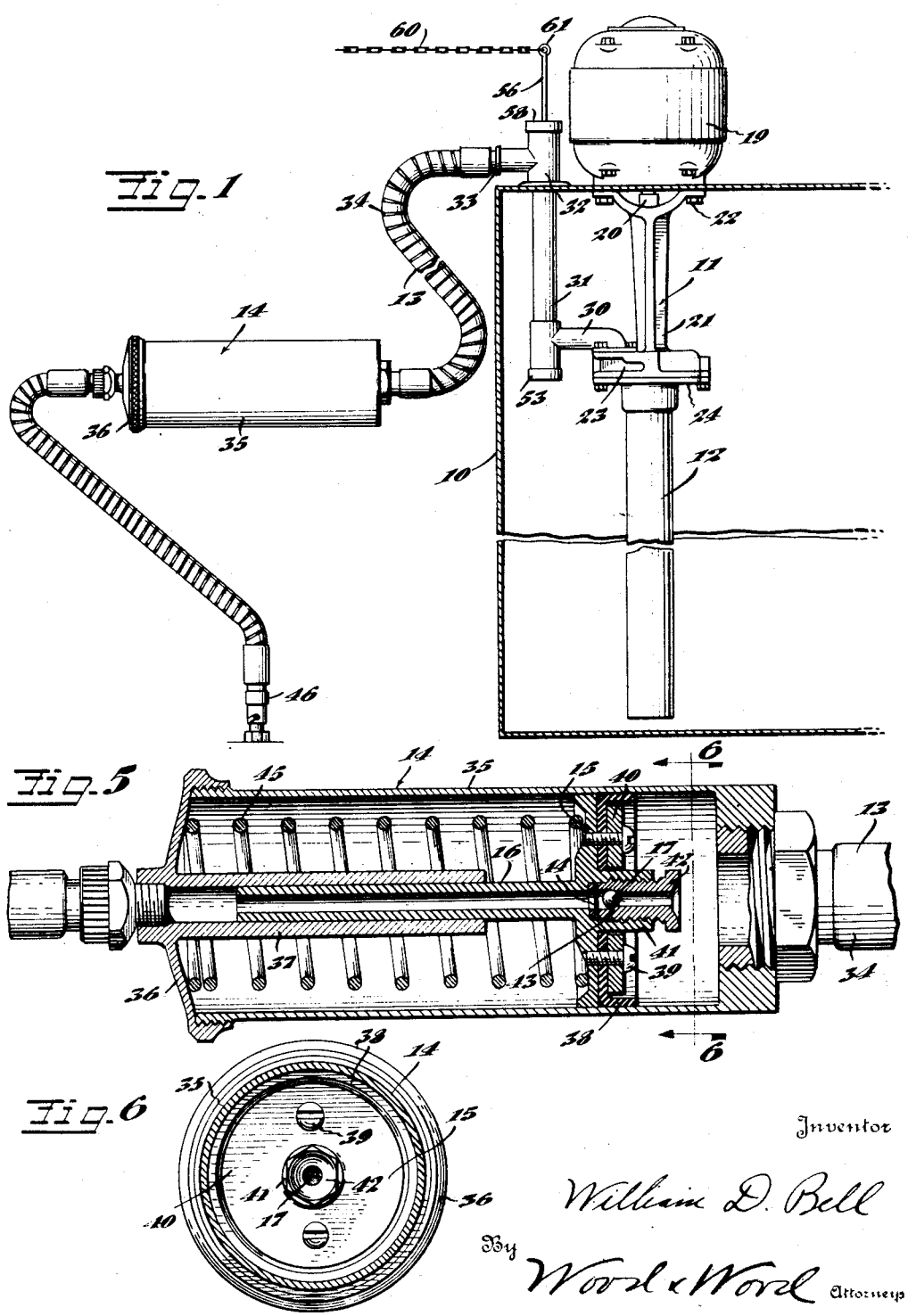

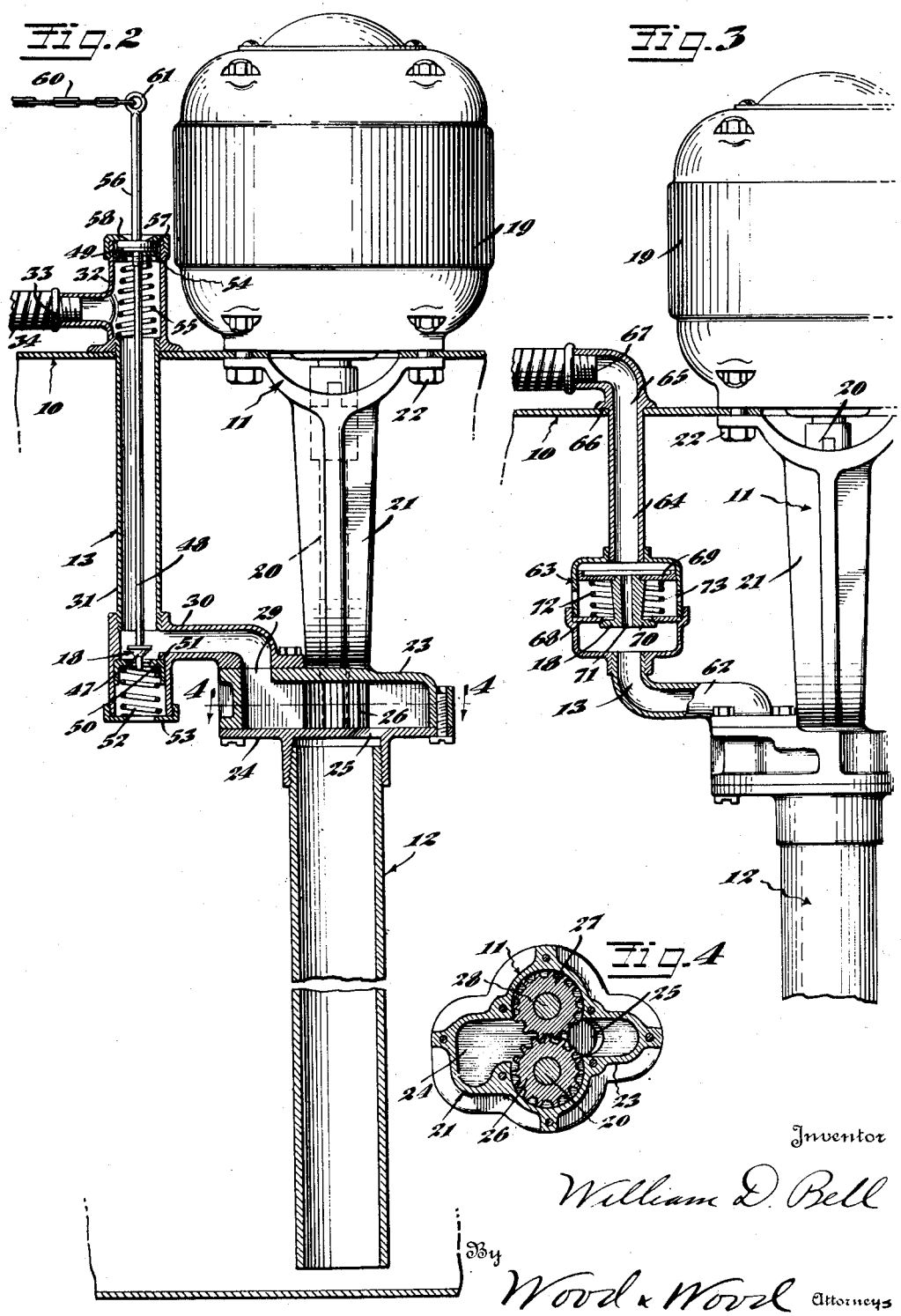

1,896,036

UNITED STATES PATENT OFFICE

WILLIAM D. BELL, OF COLUMBUS, OHIO, ASSIGNOR TO THE CINCINNATI BALL CRANK COMPANY, OF CINCINNATI, OHIO, A CORPORATION OF OHIO

LUBRICANT DELIVERY APPARATUS

Application filed October 18, 1930. Serial No. 489,631.

This invention relates to lubricant transfer means including devices for developing high pressure in the discharge line for use in those instances where the parts to be lubricated offer obstruction interfering with the normal pumped delivery flow of the grease.

The present invention has for its main object the provision of mechanisms for accomplishing efficient distribution of lubricant to any sort of environment without regard to the pressure necessitated to move the grease to the point of lubrication and in the accomplishment of this object includes a mechanism which is entirely automatic in the change-over from low pressure supply to high pressure supply operating to bring the high pressure devices into play when the necessity arises without any attention on the part of the operator.

It is another object to provide a lubricant pump capable of delivering lubricant under low or high pressure which utilizes the grease normally flowing through under low pressure for the purpose of developing high pressure and which, therefore, entirely dispenses with the necessity for pneumatics or any other form of power for operating the high pressure means.

It is another object of this invention to provide a lubricant pump of this nature in which the high pressure device is controlled by the normally developed pressure of the pump for intermittent strokes, that is to say, becomes a motor moving in regular forward and reverse strokes until the time when the obstruction is broken or the transfer is to another environment after which the low pressure flow continues as before.

Another object is to provide means within the pump for controlling the rapidity of the high pressure strokes.

Another object is to provide an electrically driven lubricant transfer pump which is readily usable in the environment of a barrel or tank of grease for elevating the grease from the lower region of the tank by mechanisms located above the grease and which has the discharge flow controllable independently of the motor.

Other objects and certain advantages will be more fully apparent from the description of the accompanying drawings, in which:

Figure 1 is a general view of the lubricant pump or high pressure grease supply means showing it mounted relative to a tank.

Figure 2 is an enlarged view of a portion of Figure 1, certain parts of the view being broken away to illustrate the pump and the manually operable relief valve in the discharge conduit.

Figure 3 is a view taken similar to Figure 1 illustrating another form of relief valve for permitting automatic reversal and continuous unattended operation of the high pressure piston.

Figure 4 is a sectional view taken on line 4—4, Figure 2, detailing the gear pump used in the distributing or transfer apparatus.

Figure 5 is a sectional view taken on line 5—5, Figure 1, detailing the construction of the high pressure device inserted in the discharge conduit.

Figure 6 is a sectional view taken on line 6—6, Figure 5, further illustrating the high pressure device.

The several general parts of the mechanism constituting the high and low pressure lubricant pump are mounted in the environment of a lubricant container or barrel 10 and are of the following nature and arrangement. A motor driven gear pump unit 11 is supported on the top of the barrel and operates at the upper end of an immersion tube 12 thereof extending to the lower regions of the barrel for lifting the grease or lubricant and discharging the same through a discharge conduit 13 to the point of delivery. A high pressure device 14 is disposed in the conduit at any desired distance from the pump. The high pressure device is controlled by the resistance or obstruction to grease flow in the device or part to which the grease is being delivered and is designed to permit ordinary low pressure flow therethrough without operation of the high pressure instrumentality.

The high pressure instrumentality may consist of a large area piston 15 carrying a tubular plunger 16 of small area at its operative end. In low pressure supply, the lubricant passes straight through the tube whereas under abnormal conditions or conditions of great resistance or obstruction, the tube is automatically closed by a valve 17 and the small tubular plunger becomes effective for imparting high pressures to the grease disposed in its path.

The high pressure piston is spring returned and for permitting this return of the piston after a high pressure shot, a relief valve 18 is provided in the conduit leading to the high pressure device. This valve is effective for opening to back pressure for bypassing the lubricant back into the tank and relieving the lubricant pack in back of the piston. It becomes apparent that operation of the high pressure piston is caused by accumulated grease acting under pumped pressure, thus developing a high pressure feed without the use of pneumatics.

Accumulated lubricant volume or pack in back of the high pressure piston operates the same for the high pressure shot whereupon the further accumulation of pumped grease results in a back pressure. The valve 18 may either be hand operated for relieving the pressure on the high pressure piston, or it may be automatically operated by the pressure to open and allow the spring 19 to return the piston, this cycle being constantly automatically repeated in the latter instance to provide intermittent high pressure shots automatically occurring without attention from the operator.

It will readily be seen that the rapidity of the high pressure strokes or shots may be controlled by the tension of the spring in back of the relief valve or by other devices readily applicable to the present mechanism.

Referring specifically to the drawings, the motor of the pump unit is indicated at 19 and may be of any type. A driving shaft 20 extends down from the motor and is journalled in a standard 21 which is fixed to the top of the container by means of the bolts 22 which also fasten the motor in position on the top. The standard, which may also be termed a bearing bracket, includes a pump casing 23 formed integrally at its lower end. The immersion tube 12 through which the grease or lubricant is lifted by suction to the region of the pump is attached to the lower end of the pump casing by means of a closure plate 24 including a downwardly disposed sleeve-like projection into which the tube 12 is screwed. An inlet port 25 is provided through the closure plate providing communication between the tube and the pump chamber.

The pump used is of any conventional gear type including a driving gear 26 and a meshing driven gear 27. The driving gear 26 is secured upon the shaft 20 extending through the pump casing and closure plate and a short shaft 28 mounted between the casing wall and closure plate loosely rotatively mounts the gear 27. The discharge opening 29 for the pump extends from the top side of the casing on the opposite side of the gears from the inlet port.

As shown in Figure 2, the inlet port 25 affords communication for entry of the grease through suction lift to the unmeshing sides of the gears, whereas, the discharge port provides the outlet at the meshing sides of the gears. The grease moves into the inlet side of the pump casing due to the vacuum or suction created by the pump. The grease carried around in the spaces between the teeth to the discharge side of the pump is displaced therefrom by reason of the meshing of the teeth of the pump, the result being that the grease finds exit from this chamber through the discharge port.

The pump used does not have to develop great pressure, since all that is needed is a forcing pressure suitable for causing a normal flow of grease through the conduits leading to the point of distribution, taking into consideration the factors of friction and distance. The grease forcing or pumping unit is assembled about the top of the tank as shown, the lower or interior parts being inserted through a filling opening (not shown) in the top of the tank.

The discharge conduit is made sectional for the reason that various devices are included therein. In those sections of the discharge conduit between the pump and the top of the tank, the valve 18 is located. The description of this valve will be withheld until a later point in the description, except to say that the lubricant passes directly through the same in its discharge course.

In the hand operated form of the valve device, a pipe casting 30 is fixed to the pump casing and includes a portion of the discharge passageway. A vertically disposed tube or pipe 31 is connected to this casting, being screw-threaded into the same. At the upper end, the pipe 31 is screw-threaded into a T 32 mounted upon the top of the tank, and passing through an orifice in the top of the tank. The lateral extension of the T 32 has a nipple 33 screwed therein, the nipple attaching one end of a flexible discharge conduit section 34 thereto. The high pressure device 14 is inserted in this flexible conduit section 34 toward the outer or discharge end thereof.

The discharge or delivery passageways made up of these conduits 30, 31 and 34 provide for low pressure flow of grease from the pump. The instrumentality 14 for high pressure is included in the flexible conduit 34 in position for automatic operation whenever required by the conditions of delivery. The casing or cylinder 35 of the high pressure device is inserted in this flexible conduit 34, the ends of the conduit sections being secured in any desirable manner. The cylinder of the discharge device is open at its outer end and a cap or closure means 36 is screwed thereon. This closure means includes an elongated boss or sleeve 37, extending well into the interior of the cylinder 35 and concentrically disposed relative to the cylinder 35 of the device.

The large area piston 15 is mounted for movement within the cylinder 35. This piston carries the forwardly extending tubular plunger 16 disposed into the sleeve 37 of the cap. The tubular plunger and the main piston may be integrally constructed as disclosed. The sleeve, therefore, functions as the high pressure cylinder for the tubular plunger.

For the purpose of sealing the large area piston at its rear side, a gasket 38 is attached by screws 39 to the rear of the piston by means of a washer 40 lying against the gasket, the gasket being of cupped form with the outer flange engaging the cylinder wall. The gasket and the washer have their central openings traversed by a rear extension 41 of the piston. This extension provides the mounting for a valve sleeve 42 screwed into the same.

The bore of the valve sleeve is counterbored toward its inner end, the shoulder provided by the joinder of the respective bores, functioning as a valve seat 43 for the ball valve 17, the ball being loosely maintained in the counterbored portion by means of a cross pin 44 diametrically disposed through the extreme inner end of the sleeve.

The ball valve, therefore, unseats to normal flow and seats, due to the development of pressure beyond the valve such as might rise because of resistance to delivery or obstruction in the line. A coil spring 45 under compression is disposed between the cap and the outer face of the piston, this spring surrounding the sleeve extension 37 of the cap and the hollow plunger 16. The piston is shown in an intermediate position in the detailed view (Figure 5) of the drawings, it being understood that it moves between definite limits or abutments constituted by the rear end of the cylinder and the inner end of the sleeve-like projection of the cap. Any conventional type of coupling means 46 may be utilized at the extreme end of the discharge hose beyond the high pressure device, for attaching the hose for filling purposes to any type of lubricating fitting.

The large area or high pressure piston is inactive during the low pressure passage of grease through the hose and is not used in those instances where it is merely desired to transfer the grease from the container to the point of lubrication without encountering resistance or necessitating grease insertion force. If it should occur that the flow of grease is obstructed by stoppage in the fitting or bearing known as a "frozen" fitting or bearing, the grease which has passed through the tube past the valve is trapped, and provides back pressure in the conduit, the sleeve extension, and the tubular plunger, thereby seating the valve 17 and plugging the tubular plunger against any further flow of grease. When this occurs, the grease flow is affective against the rear face of the large area piston, and because of the difference in area of the large piston as compared with the small area of the tubular plunger, a greatly increased pressure amounting to high pressure, as classified in this art, is imparted to the grease trapped in front of the valve. The piston, therefore, moves against the pressure of the spring expelling a portion of the contents of the tubular plunger and conduit in the form of a high pressure shot or impulse of grease.

In order to permit return of the high pressure piston after a discharge shot, valve means 18 are provided in the conduit between the pump and the high pressure device. Two forms of valves 18 are shown.

In the first form for use in the conduit structures described, it is necessary to manually hold the valve in closed position to permit the pump to function in the manner heretofore described. This type of valve consists of a tapered valve portion 47 located in the lower end of the casting 30, a long stem 48 extending through the pipe 31 into the top of the T and having a head 49 as the point of engagement for manipulation of the valve.

In the downward extension of the casting 30, a valve seat element 50 is provided of inverted cup shape having sealing contact with the cylindrical wall of its chamber. This element is urged upwardly against a shoulder 51 between the main passage and the downward extension by means of a coil spring 52 held under compression by means of an apertured cap 53 screwed on the downward extension. The seat element is centrally apertured and chamfered to provide a tapered valve seat engageable by the valve. Within the T at the top of the tank the head provided on the end of the valve stem is engaged by an inverted cup gasket 54 against its under side, the gasket being maintained in such position by means of a coil spring 55 secured under compression between the gasket and the top of the tube 31 screwed entering into the T.

The control for the valve or manipulating means consists of a lever 56 having a head 57 on its lower end abutting the head of the valve stem, and held there-against by means of a nut 58 having an overhanging flange and screwed on to the upper end of the T.

Depression of the valve stem and valve and seating of the valve are accomplished by pulling laterally on the upper end of the lever. Due to the confinement of its head 57 under the flange of the nut and the spring pressed engagement of the valve head against this head, the lateral pull is effective for tilting or rocking the head of the lever against the head of the valve stem, thus depressing the same and seating the valve.

Since the valve seat element 50 is under spring pressure upwardly, it is to be observed that the lateral pull on the lever need not be accurately governed since after the valve is seated, its seat is free to move under it against spring pressure.

Assuming that there is no pull exerted on the valve lever and the motor of the pump is running, all fluid or lubricant is being by-passed by way of the pump chamber, passageway in the casting 30, through the valve port in the seat element, through the downward extension of the casting, and through the opening in the cap 53. If the valve is closed by rocking of the lever 56, the action of the apparatus will be, to continue a low pressure supply until resistance should occur, whereupon the high pressure piston acts to expel a shot or impulse of grease. If the valve is still maintained in closed position the valve seat element 50 will be forced away from the valve for by-pass of the lubricant in the same manner as if the valve were released or opened. It will be understood that the spring of the high pressure piston and the spring of the valve seat element must be of proportionate expansion strength consistent with the operation described. The high pressure piston must be movable against its spring 45 to effect a high pressure shot without disturbing the valve seat element 50, the spring 52 of the latter only compressing when full pump pressure is exerted thereon.

Return of the high pressure piston may also occur automatically when the valve is released since the pressure of grease on its head is relieved through the by-passage around the control valve.

The requisite lateral movement may be imparted to the valve control lever by any convenient instrumentality. In this instance a chain 60 is shown fixed to ring 61 formed at the upper end of the lever. This chain may extend (not shown) to the end of the discharge conduit for convenient access and manipulation by the operator watching the delivery of grease at the point of distribution.

The modified form of control or relief valve is automatically operated for causing the high pressure piston to operate continuously as long as resistance is encountered. A slightly different form of conduit connection between the pump and the top of the tank is provided in this instance. A casting or pipe 62 having a reverse bend therein, is bolted to the pump casing and provides one section of the grease discharge passage. A valve chamber 63 for the relief valve, is attached to this section of pipe and another section of pipe 64 extends upwardly to the top of the tank and includes an elbow 65 providing a shoulder 66 resting upon the upper surface of the tank. The flexible conduit 34 is connected to this elbow by any suitable means such as a nipple 67.

The valve casting or chamber is sectional consisting of upper and lower sections screwed together, the sections of pipe 62, 64 being secured to the respective sections of the valve chamber.

A washer or disc 68 having a central opening providing a valve seat around its lower margin is secured between the attached sections. The relief valve 18 includes an actuating piston or head 69 secured to the main body of the valve. The main body of the valve depends through the opening in the disc and has a lower or seating flange 70 engaging upwardly against the previously described seat. The valve body includes a central passageway 71 providing the passage for normal low pressure flow through the discharge conduit. The valve is held upon its seat by means of a coil spring 72 under compression between the piston head and the stationary washer or disc.

The valve chamber below the actuating piston is provided with apertures 73 opening into the tank, the purpose of which will be apparent as the description progresses.

Assuming an operation where an obstruction has been encountered preventing the low pressure flow of grease through the line to the fitting, the high pressure piston will have been operated for a high pressure shot or impulse of grease. The grease will then be forced into the conduit between the relief valve and the back of the high pressure piston and since the piston has moved against a positive abutment having compressed the spring, the next expansion point will be at the relief valve.

The spring holding the relief valve on its seat is of such strength that it holds the valve seated while the high pressure piston is being moved against the pressure of its spring. That is to say the compression of the two springs is properly proportioned to bring about successive operation in the mentioned order. It becomes at once important that a fairly large area be provided against which the grease may act after moving the high pressure piston. The disk like head of the relief valve presents an area suitable for the rapid relief of the lubricant. As this disc moves, immediately unseating the valve, the low pressure flow from the pump passes through the valve seat opening and out through the apertures in the valve casing. At this time, since the input of grease to the conduit between the relief valve and the high pressure piston has ceased, the pressure drops and the expressive action of the spring 45 occurs to reestablish the high pressure piston to original or initial position. The grease in the conduit is backed up by the action of the spring and returned to the tank by way of the central opening 71 of the valve 18 and the valve seat opening.

By the use of the type of valve last described, the high pressure piston continues to perform regular strokes delivering the grease under high pressure in impulses of predetermined quantity. Either type of valve is applicable to the pump, depending upon the type of lubrication being done.

In the instance of the manually moved control lever it is possible to interrupt the flow of grease without stopping the motor of the pump, this control being conveniently and arbitrarily extended as desired. In either instance the automatic reversal and continuous operation of the high pressure piston may be accomplished.

Having described my invention, I claim:

1. A lubricant delivery apparatus, comprising, a motor driven pump, a delivery conduit extending from said pump, a high pressure device located in said conduit non-interfering with normal pressure flow, means in said device, active when resistance occurs in the conduit beyond the high pressure device for closing the conduit against low pressure flow, whereby the grease becomes effective for actuating the high pressure device, a relief valve in the conduit between the high pressure device and the pump for permitting relief of the lubricant pressure on the high pressure device, and means for returning said high pressure device.

2. A lubricant delivery apparatus, comprising, a pump means for driving said pump, a delivery conduit extending from said pump, a high pressure piston device disposed in said conduit having a passageway therethrough for normal low pressure flow, a valve in said passageway closing to back pressure and causing the grease flow to act against the high pressure piston device, and a relief valve located in the line between the pump and the high pressure piston, said valve opening for by-passing the lubricant and relieving the pressure in back of the high pressure piston whereby the high pressure piston is free to return.

3. A lubricant delivery apparatus, comprising, a power driven pump unit mounted upon a container head and having its intake immersed in the lubricant, a discharge conduit extending from said pump unit, a high pressure lubricant operated piston device located in said discharge line, including a tubular plunger, cylinders formed in the discharge line respectively containing the piston and plunger, a valve located in the tubular plunger, said valve unseating to normal lubricant flow through the discharge line from the pump and seating to developed pressures in the line at the point of delivery whereby the lubricant flow is effective upon resistance to flow in the line against the entire area of the piston for a high pressure discharge of lubricant, and means for returning the piston to normal position.

4. A lubricant delivery apparatus, comprising, a power driven pump adapted to be mounted in a lubricant container, a discharge conduit extending from said pump, a high pressure piston in said discharge conduit having a central passageway therethrough, a valve in said passageway opening to normal pumped flow and closing to resistance in the line, means for holding the piston in retracted position, and a valve in the line between the piston and the pump for by-passing the flow of lubricant back into the tank from which it is pumped, whereby the lubricant flow is effective, upon encountering resistance, against the face of the piston for a high pressure discharge.

5. A grease dispensing apparatus, comprising, a power driven pump mounted on the head of the grease container including an immersion tube having the elements of the pump mounted at its upper end, a delivery conduit extending from said pump, a flexible conduit extending from said delivery conduit, a high pressure cylinder inserted in said flexible conduit, a high pressure piston mounted in said cylinder, a tubular plunger carried by said piston, said tubular plunger of considerably reduced diameter relative to the diameter of the piston, a cylinder supporting said piston formed within the high pressure cylinder, a ball valve in said tubular plunger seating to back pressures exerted from the point of delivery, a spring for maintaining said piston and plunger in retracted position, and a relief valve in the discharge conduit between the high pressure piston and the pump for by-passing the discharge of the pump into the tank, after the ball valve has been set and the high pressure piston operated, for permitting return thereof as induced by the spring.

6. In a lubricant delivery means, a power driven pump adapted to be mounted relative to a lubricant container for pumping therefrom, a discharge conduit extending from the pump, a high pressure cylinder in said conduit, a high pressure piston device in said cylinder including a tubular plunger, a ball valve in said plunger seating to back pressures caused by undue resistance in the line for causing the lubricant flow to act on the high pressure piston, a relief valve casing in the line between the pump and the high pressure piston, a relief valve mounted in said relief valve casing and including a piston portion and a tubular stem portion including the valve head, and a seat portion formed in said casing for seating said valve head, whereby the grease between the head and the high pressure piston after operation of the piston acts upon the head to unseat the valve, the valve casing including apertures entering into the tank, opened by said valve movement to flow of grease for permitting by-passing thereof back into the container.

7. A grease dispensing apparatus, comprising, a constant delivery power driven pump mounted on the head of the grease container including an immersion tube having the elements of the pump mounted at its upper end, a delivery conduit extending from said pump, a flexible conduit extending from said delivery conduit, a high pressure cylinder inserted in said flexible conduit, a high pressure piston mounted in said cylinder, a tubular plunger carried by said piston, said tubular plunger of considerably reduced diameter relative to the diameter of the piston, a cylinder supporting said piston formed within the high pressure cylinder, a ball valve in said tubular plunger, seating to back pressures exerted from the point of delivery, and a spring for maintaining said piston and plunger in retracted position.

8. In a lubricant delivery means, a power driven pump, a discharge conduit extending from said pump, a high pressure cylinder in said conduit, a high pressure piston, including a plunger, mounted in said high pressure cylinder of the discharge conduit, said plunger having a passageway therethrough for normal flow of the pumped lubricant, a valve in said passageway seating to back pressure for directing the flow of lubricant against the piston for operating the same, a manually operable valve in the line between the pump and the high pressure piston for by-passing the pumped flow, and a seat for said valve compressibly mounted for actuation and movement away from the valve when the lubricant flow has been effective for operating the high pressure piston.

9. In a grease delivery system, a booster, a continuously operated pump delivering grease to said booster, a booster piston moved by excessive pressure developed in the pump delivery to the booster for high pressure delivery of grease, and a back pressure valve in the delivery to the booster operative to allow the return of the booster piston.

In witness whereof, I hereunto subscribe my name.

WILLIAM D. BELL.